Dec. 16, 1952     J. H. PALMER     2,621,584
AUTOMATIC ELECTRIC TOASTER
Filed Oct. 13, 1949     2 SHEETS—SHEET 1
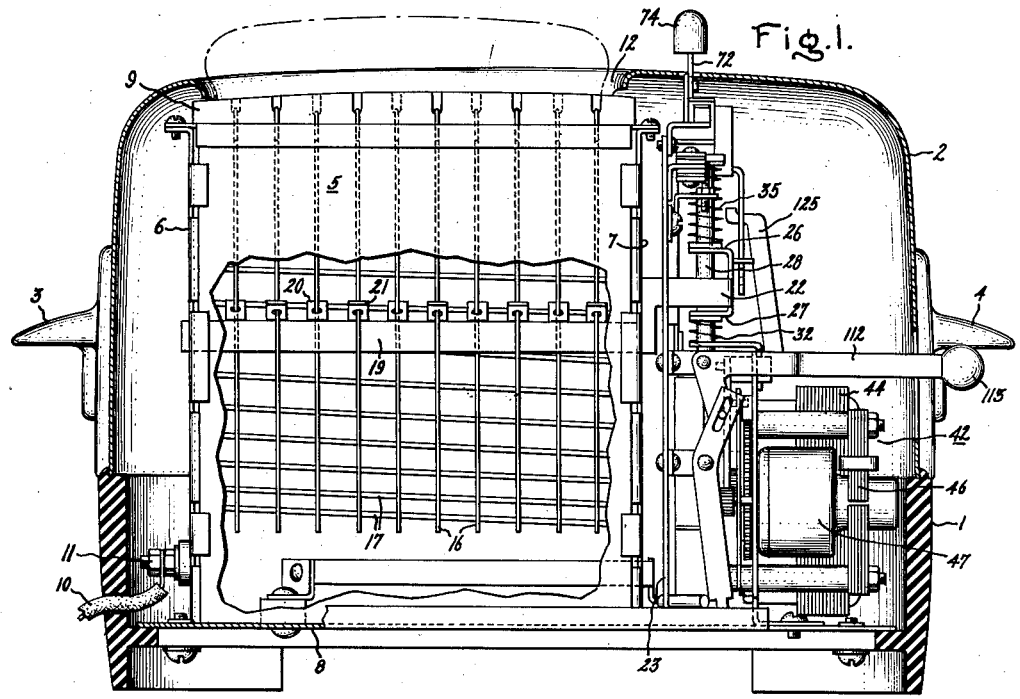
Inventor:
John H. Palmer,
by *Sheridan & Begg*
His Attorney.

Dec. 16, 1952     J. H. PALMER     2,621,584
AUTOMATIC ELECTRIC TOASTER
Filed Oct. 13, 1949     2 SHEETS—SHEET 2
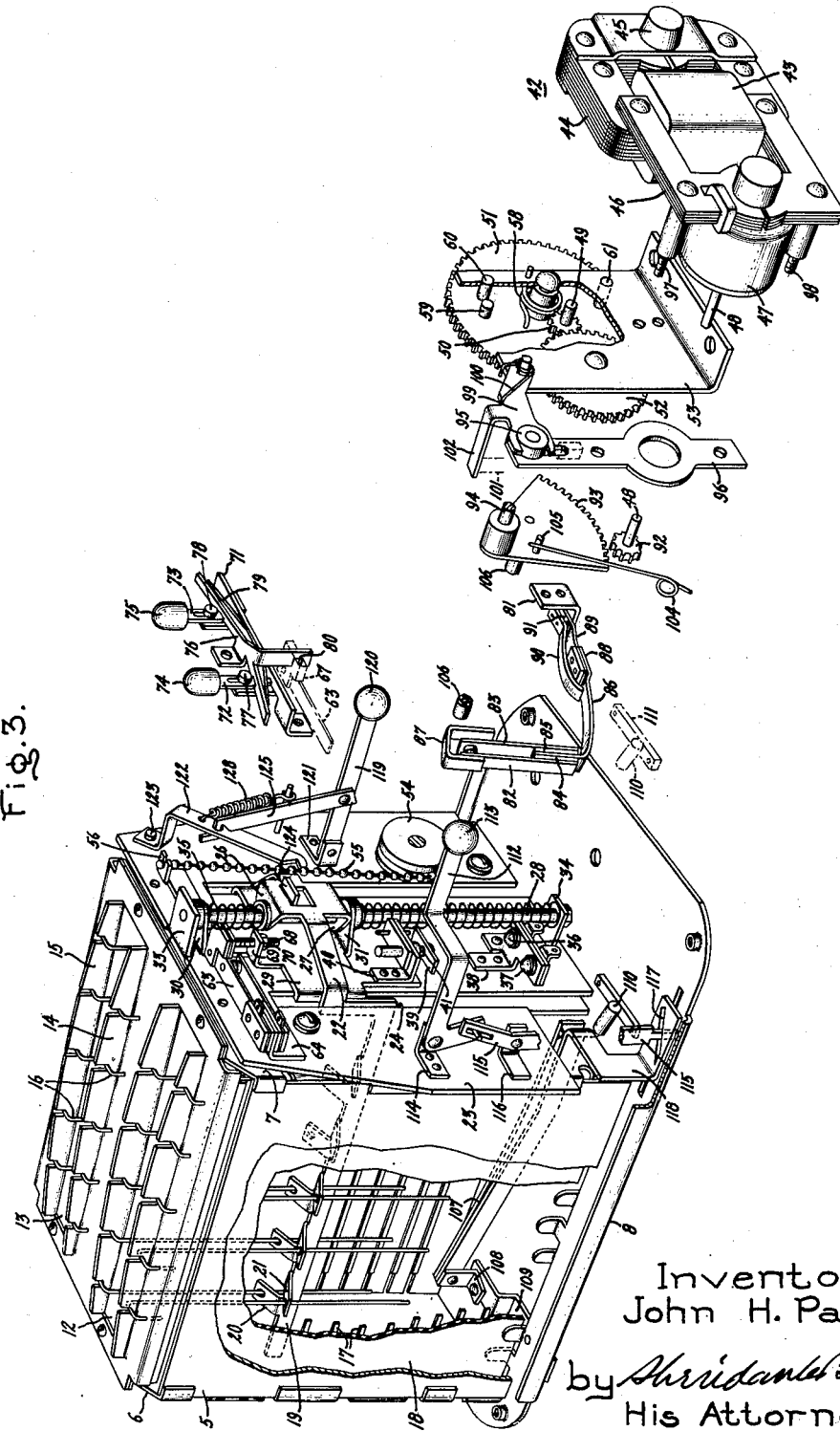
Inventor:
John H. Palmer,
by *His Attorney.*

Patented Dec. 16, 1952

2,621,584

UNITED STATES PATENT OFFICE 2,621,584

AUTOMATIC ELECTRIC TOASTER

John H. Palmer, Milford, Conn., assignor to General Electric Company, a corporation of New York Application October 13, 1949, Serial No. 121,134

4 Claims. (Cl. 99—328)

This invention relates to electric cooking apparatus, and more particularly to an automatic electric toaster.

Automatic toasters often depend upon finger pressure, not only to lower a toast carriage, but also to latch the carriage in its lower or toasting position. There is a tendency with such toasters to push harder than necessary on the finger lever in order to lower the carriage and properly latch it in position. This may damage a delicate latching or releasing mechanism, may tip the toaster, or may bring the operator's fingers too close for comfort to a toaster which has just been operated. If the carriage lifting mechanism is operated by a strong spring, considerable physical effort is required to lower the carriage against the action of this spring.

A primary object of my invention is, therefore, to provide an electric toaster for automatically lowering a toast carriage to toasting position, energizing the toaster heating element, timing a toast cycle to produce toast of the desired color, and returning the toast carriage to its upper non-toasting position.

Another object of my invention is to provide a dual electric motor for a combined power drive for the toaster carriage and timing of the toasting cycle.

A further object of my invention is to reduce the cost of producing such an automatic electric toaster having electric motor power drive and timing without employing two separate motors.

Still another object of my invention is to provide an improved arrangement, in connection with an electric motor timer, for automatic temperature compensation of the toasting period and manual control for regulating the color of completed toast.

In accomplishment of the foregoing objectives, one of the features of my invention consists in employing a dual motor in an automatic electric toaster for not only driving the toast carriage to a toasting position against the action of a resilient biasing member, but also for timing the toasting cycle. This dual motor includes a common field structure for operation of an induction motor rotor for the power drive and a synchronous motor rotor for timing. Another feature of my invention consists in a mechanism operated by the timer rotor for terminating toaster operation after a predetermined period of time, with provision for automatically altering the toasting period in response to changes in the toaster temperature and a manual control by which the operator may adjust the length of the toasting cycle.

The features of my invention which I believe to be novel are set forth with particularity in the appended claims. My invention itself, however, together with further objects and advantages thereof, may best be understood by reference to the following description taken in connection with the accompanying drawing, in which Fig. 1 is a side elevation in section of my improved toaster; Fig. 2 is an end elevation with the outer toaster casing removed; Fig. 3 is an exploded view in perspective; and Fig. 4 is a schematic wiring diagram.

In Fig. 1 of the drawing, my invention is illustrated as embodied in a toaster having an outer casing comprising a plastic base portion 1 and an upper metallic hood 2. For convenience, handles such as 3 and 4 may be attached to hood 2. Within the casing is a toasting compartment enclosed by side walls such as 5 and end walls 6 and 7. A base plate 8, attached to the plastic base portion 1 encloses the bottom of the toasting compartment, and extends to form a base for the toaster operating mechanism. A top plate 9 defines the upper enclosing surface for the toasting compartment and includes slots 12 and 13 through which slices of bread to be toasted may be inserted. Electric power for toaster operation is supplied through an electric cord 10 anchored to an appropriate terminal structure 11.

Access to the toasting compartment is provided by the two toast receiving slots 12 and 13. Each toast receiving slot is defined by a pair of upstanding flanges 14 and 15, as shown by Fig. 3, which are notched at spaced points to receive a plurality of guide wires 16. The purpose of these guide wires is to retain slices of bread within the toasting compartment out of contact with the heating element wires 17 carried on insulating backing sheets 18. Preferably, each toast receiving slot includes a pair of such heating elements mounted adjacent each side of the toast position, so that both sides of a slice are toasted simultaneously. Material to be toasted is supported within the toasting compartment on a toast carriage rack such as 19, each rack being formed from a strip of sheet metal with a plurality of laterally extending and oppositely directed ears 20 and 21. Each ear is apertured for slidable movement with respect to guide wires 16. As shown in Fig. 3, toast racks 19 associated with each of the toast receiving slots are formed integrally and connected together by a cross bar 22 in the mechanism compartment. Toasting compartment end walls 7 and a heat barrier plate 23 are slotted at 24 and 25 to permit a vertical reciprocating movement of the toast racks and cross bar. The function of heat barrier 23 is to thermally isolate the toaster operating mechanism, to be described hereinafter, from the toasting compartment, thus prolonging the life of the component parts.

As shown more clearly in Fig. 3, cross bar 22 is formed with upper and lower inwardly extending flanges 26 and 27, apertured for slidable movement on a carriage supporting rod 28. Associated with cross bar 22 is a carriage plate 29, also mounted for vertical reciprocating movement on rod 28 through the use of outwardly extending and apertured flanges 30 and 31. As shown in Fig. 3, rod 28 is supported by heat barrier plate 23 between upper and lower outwardly extending ears 33 and 34. A spring 32 encircles rod 28 between the lower ear 34 and flange 31, on the carriage plate, so that whenever the assembly of the toast racks, cross bar, and carriage plate is depressed to lower or toasting position, spring 32 is compressed. A second spring 35 encircles the upper end of rod 28 for a purpose to be described more fully hereinafter.

For the toasting operation to be performed automatically, it is desirable that the main toaster heating elements be energized whenever the toast carriage is in its lower or toasting position. For this purpose, power is supplied to the heating elements through contacts 36 and 37 insulatingly supported on a bracket 38 attached to the heat barrier plate. A bridging contact member 39, carried by a bracket 40 riveted or otherwise secured to carriage plate 29, completes the circuit through contacts 36 and 37 whenever the toast carriage is lowered to toasting position. Preferably, the bridging contact member is loosely supported on a pin, such as 41, to insure positive engagement with contacts 36 and 37 in spite of misalignment due to assembly tolerances or wear.

In accordance with this invention the toast carriage, comprising the toast racks, cross bar, and carriage plate, is power driven to the lower or toasting position and retained for a timed period in such position during the toasting operation. This power drive and timing is performed by the use of a dual electric motor, illustrated generally at 42 in Fig. 3. The dual motor employs a single field coil 43 for generating magnetic flux in a compound field structure having two magnetic paths. One portion 44 of this field structure is arranged to conduct flux for operation of an induction motor rotor 45. In particular, for this application rotor 45 is constructed to furnish power for driving the toast carriage to its lower position and to remain stalled during the period of toaster operation without damage to either the rotor or the field. The other magnetic path, formed by core 46, is the field structure for a synchronous motor rotor employed for timing the toasting cycle. Preferably this rotor comprises a sealed unit 47 containing not only the rotor itself, but also reduction gearing. This rotor structure may be similar or identical with the sealed rotor structure commonly used for electric clocks. In particular, for this application I have found that a rotor and gearing unit resulting in rotation of the outwardly projecting shaft 48 at one R. P. M. provides a satisfactory timing motor. With such a motor construction, application of power to field coil 43 starts rotation of torque rotor 45 as well as the timing rotor unit 47. When the torque rotor has driven the toast carriage to its toasting position, it remains stalled while the timing rotor continues in operation. This construction thus provides a dual motor for driving the toast carriage and for timing the toasting operation, while utilizing only a single field.

Referring again to the exploded view of Fig. 3, a reduction drive is employed to transform the rotary motion of the induction motor rotor 45 into a translating movement to lower the toast carriage. For this purpose, a motor drive shaft 49, having on its outer end a pinion 50, rotates a final drive gear 51 through an idler gear 52 and idler pinion (not shown). The idler gear and pinion and the final drive gear are rotatably supported on a fixed supporting plate 53 adapted to be mounted on base plate 8. The final drive gear 51 has secured thereto a winding drum 54 for winding around its outer surface a pull-chain 55, which is connected to a laterally-extending ear 56 on carriage plate 29. It is thus seen that whenever rotor 45 rotates, the winding drum is rotated which, through the pull-chain, lowers the carriage to its toasting position. Such a downward movement of the toast carriage also compresses spring 32. Likewise, rotation of the final drive gear 51 to lower the carriage places a spring 58 under torsional stress. Therefore, when motor 43 is de-energized, the compressive stress in spring 32 returns the toast carriage to its upper or non-toasting position, and the torsional stress in spring 58 returns the drive mechanism to the initial position. The extent of rotation of the final drive gear preferably is limited by mounting a stop pin 59 on one face of gear 51, which pin is adapted to abut against a starting pin 60 secured to supporting plate 53 or a motion-limiting pin 61 likewise affixed to the supporting plate. Pins 59, 60, and 61 are so located with respect to the carriage drive that when pin 59 abuts against pin 60 the carriage is in its uppermost position; but when pin 59, along with the final drive gear, has been rotated to lower the carriage to its lowermost position, further rotation of the gear is prevented by abutment of stop pin 59 against the fixed pin 61.

With the above arrangement for power drive of the toast carriage to toasting position, it is seen that a toasting operation may be commenced merely by energizing motor 42. For this function, I prefer to employ a carriage-operated switch, the details of which are shown more clearly in Figs. 2 and 3. This switch comprises a pair of resilient contact arms 62 and 63 supported on heat barrier 23 by a bracket 64, with appropriate insulating blocks to electrically insulate the contact arms from each other and from the bracket. Suitable contact points 65 and 66 are mounted adjacent the ends of the contact arms. On the outer end of the upper contact arm is an insulated laterally-extending portion 67 adapted to be engaged by the upper end of a threaded stud 68 extending through an outwardly-extending ear 69 on carriage plate 29. Lock nuts 70 permit factory adjustment of the position of the stud, so that when the carriage is in its upper or non-toasting position, the upper end of stud 68 forces the end of the upper contact arm upwardly to open the contact points. Thereafter, whenever the carriage is given a slight downward movement, as, for example, when a slice of bread is inserted into one of the toast-receiving slots and given a slight downward push, the carriage is moved downward slightly permitting the resilient bias in contact arm 63 to close the contact points and start operation of motor assembly 42. In addition, it may be desirable to include a manually-operable arrangement by which toaster operation may be started or stopped. Referring again to Figs. 2 and 3, a switch plate 71 is secured to the barrier plate 23. Slidably supported on this switch plate and guided by pins 77 and 78 are operating rods 72 and 73 having on their upper ends respectively a start button 74 and a stop button 75. Pivotally mounted between these two operating rods is a rocker member 76 operable by shoulders formed on the operating rods. A leaf spring 79 attached to the switch plate tends to retain the rocker in a neutral position. A depending arm of the rocker is notched at 80 to receive the insulated end 67 on switch arm 63. Hence, whenever start button 74 is depressed, operating rod 72 forces a movement of the rocker member resulting in downward movement of its depending arm, thus closing the contact points to start operation of the motor. Conversely, if at any time during toaster operation it is desired to interrupt motor operation, stop button 75 is depressed, causing an upward movement of the depending arm of the rocker, to separate the contact points. Thereafter the compressive strength in spring 32 returns the toast carriage to its upper position, whereupon the stud 68 retains the contact points open.

For fully automatic toaster operation a further switching arrangement is required for interrupting motor operation after a predetermined period of time. This switch is affixed to a bracket 81 which, in turn, is attached to gear supporting plate 53. The switch itself comprises a pair of contact arms 82 and 83 carried on insulating blocks 84 and 85 attached to a stiff supporting arm 86. Adjacent the outer end of these contact arms are the usual contact points. Contact arm 82 carries a suitable U-shaped operating head 87. Contact supporting arm 86 is suitably attached at 88 to a resilient leaf spring 89, which in turn is attached to the supporting bracket 81. A stiffening spring 90 may be attached to bracket 81 and spaced from spring 89 by block 91 to reduce undesired vibration. With this arrangement and mounting of the switch with the contact points biased to a normally closed position, a force applied to the U-shaped head 87 tending to open the contact points first causes a displacement of the entire switch assembly, due to the fact it is supported on leaf spring 89. However, when further movement of supporting arm 86 is prevented, application of additional force to the U-shaped head results in separation of the contact points to terminate motor operation.

In accordance with this invention, the timing motor rotor assembly 47 provides the force for opening the contact points on arms 82 and 83. On the outer end of the timer motor shaft 48 is a timer pinion 92, which engages a timer sector 93 whenever the toaster is in operation. Sector 93 is supported on a shaft 94 rotatable in a bushing 95, which in turn is mounted on a support 96 in a manner permitting limited vertical movement. Support 96 is held in a fixed position on studs 97 and 98 projecting from the motor field structure. Sector bushing 95 is vertically movable on support 96 by a yoke 99 pivotally carried by gear plate 53. A spring 100 tends to rotate yoke 99 in a counterclockwise direction, as viewed in Fig. 3, to force bushing 95 downwardly and thus engage the teeth of sector 93 with timer pinion 92. However, located on the bracket carrying the bridging contact member 39 is an upstanding pin 101, which, being connected to the carriage plate 29, moves upwardly and downwardly upon corresponding movement of the toast carriage. Therefore, whenever the toaster is in its up or non-toasting position, pin 101 engages a laterally-extending arm 102 on yoke 99 to raise bushing 95 and hence disengage sector 93 from the timer pinion 92. However, whenever the toast carriage is lowered, spring 100 rotates the yoke in a counter-clockwise direction, lowering bushing 95 to engage the timing sector with its pinion. The timing sector itself is also biased in a counterclockwise direction by a spring 104 engaging a pin 105 projecting outwardly from the face of the sector. Therefore, at the beginning of a toasting operation, the sector 93 is always in the position shown in Fig. 3. As soon as a toasting operation is started by closure of the carriage-operated switch energizing motor 42, the sector and the pinion gear become engaged and thereafter a counterclockwise rotation of the pinion results in a clockwise rotation of the sector. Secured to the sector is a switch operating pin 106 projecting outwardly to engage U-shaped switch head 87. As the sector gear rotates in response to operation of the timing motor, this pin comes into engagement with the U-shaped head, resulting finally in opening of the contact points carried on arms 82 and 83 to terminate motor operation and end the toasting cycle.

Since motor 47 operates at a synchronous speed, I provide an arrangement in connection with the resiliently mounted timer switch for compensation of the toasting time in response to the temperature within the toasting compartment. Referring again to Fig. 3, a bimetallic element 107 is secured to a bracket 108 pivotally attached to a support 109 on the toaster base plate. On the outer end of the bimetallic element is a bushing 110, adapted to ride on a bearing plate 111 affixed to the toaster base plate. Bushing 110 is at the left-hand end of its travel when the bimetallic element is cool, corresponding to a cool toasting compartment, and moves laterally to the right, as shown in Fig. 3, in response to an increase in temperature in the toasting compartment. As shown in phantom lines, the bushing 110 is in operative relation with the switch supporting arm 86. As explained above, as the switch pin on the timer sector tends to move the timer switch to its open position, leaf spring 89 first flexes until further motion of arm 86 is interrupted by coming into engagement with thermostat bushing 110. Thereafter, a further movement of the switch pin separates the contact points carried by arms 82 and 83, since no further movement of the contact supporting arm 86 is permitted. With such an arrangement, the point at which the timing switch opens depends upon the relative position of the thermostat bushing 110 with respect to the resilient switch supporting arm 86, thereby providing automatic compensation of toasting time in response to changes in toasting compartment temperature.

I find it desirable further to provide a manual color control permitting the toaster operator to obtain toast of the desired color by regulating the toasting period. As shown in Fig. 3, a color control lever 112, having an operating knob 113 on its outer end, is pivotally supported with respect to barrier plate 23 by a bracket 114. A vertical movement of color control lever 112 is arranged to cause a pivotal movement of a link 115 through a pin and slot connection. Link 115, which is pivotally mounted on an angle bracket 116 secured to barrier plate 23, has its lower end disposed for movement in an angularly disposed slot 117 of a thermostat positioning lever 118. With this arrangement, a vertical movement of the color control knob 113 results, through this linkage, in a transverse movement of the outer end of thermostat positioning lever 118. Therefore, for a shorter toasting cycle, the color control lever is moved upwardly causing a movement to the right of lever 118 as shown in Fig. 3. This causes a similar movement to the right of the bimetallic strip 107, since both lever 118 and the bi-metallic strip are secured to the same pivotally-mounted angle bracket 108. The final result, then, of moving color control lever 113 upwardly is to shorten the toasting period by movement of bushing 110 into closer proximity with resilient contact supporting arm 88. Conversely, a downward movement of the color control lever results in a longer toasting cycle and darker toast. However, for any particular setting of the color control lever, the automatic temperature compensation arrangement results in the same degree of toasting on successive uses of the toaster.

In an automatic toaster of this kind, it is often desired by the operator to toast buns or small slices of bread, the upper edges of which would not project far enough above the hood when the toast racks are in non-toasting position to permit withdrawal of such short slices without burning the fingers. I have therefore provided a manual means whereby the operator may raise the toast racks an additional amount, such as three-quarters of an inch to an inch. As described above, the toast racks and cross bar 22 are separate from carriage plate 29, which permits movement of the cross bar upwardly with respect to the carriage plate. As shown in Figs. 2 and 3, spring 35 tends to force the cross bar downwardly so that it moves with carriage plate 29. Projecting outwardly from cross bar 22 is an ear 124 oriented to be in the path of travel of a lifting arm 122 pivotally supported on the heating barrier by a pin 123. Lifting arm 122 is operable so that its outer end moves upwardly or downwardly in response to a corresponding movement of knob 120 and lever 119 through the use of a connecting link 125. Lever 119 is pivotally supported on a suitable bracket 121 carried by the heat barrier. With this arrangement it may be seen that when the toasting cycle is completed and the carriage plate is in its upper non-toasting position, the raising of extra-lift lever 119 results in a clockwise rotation of arm 122 until its outer end engages projecting ear 124 on the cross bar. Further upward motion of lever 119 causes arm 122 to raise the cross bar and toast racks against the compression of spring 35. Subsequent release and lowering of the extra-lift lever allows spring 35 to return cross bar 22 and the toast racks to their normal position in which flange 27 on the cross bar rests on flange 31 of the carriage plate. In order to keep arm 122 from interfering with normal operation of the toaster, a spring 128 may be stretched between arm 122 and an appropriate point of attachment on the heat barrier plate so as to bias the extra lift lever and arm 122 to their lowered positions.

The operation of this toaster may be more clearly understood by a reference to the schematic wiring diagram of Fig. 4. Electric power for toaster operation is supplied through incoming electrical supply lines 126 and 127. Initially, contact points 65 and 66 of the carriage-operated starting switch are open, and the contact points carried by arms 82 and 83 of the timer switch are closed. The field coil 43 of the dual motor is only energized when both of these contact sets are closed. Upon a slight downward movement of the toast carriage, the corresponding downward movement of stud 68 permits the resilient bias in contact arm 63 to force contact 65 into engagement with contact 66 thus starting the dual motor. Alternately, as explained above, the start button may be depressed, forcing its operating rod downwardly so that the rocker member 76 closes contacts 65 and 66 to start motor operation. As the carriage moves downwardly, the contacts remain closed and the carriage moves to its lowermost position, whereupon the driving rotor 45 is stalled. This retains the toast carriage in toasting position and the downward movement results in the bridging contact 39 completing the circuit to the heating element 17 through fixed contacts 36 and 37. The toasting operation continues until such time as rotation of the timing rotor assembly 47 through the timer drive mechanism separates the contacts carried on arms 82 and 83, thus interrupting the circuit to the motor, permitting the carriage spring to force the carriage to its upper position.

From the foregoing, it is seen that I have provided a fully automatic toaster which may be placed in operation either by insertion of a slice of bread into a toast-receiving slot and giving it a slight downward push, or by depression of a start button. Thereafter the entire toasting operation is performed automatically, the completed toast being raised to an exposed position for ready removal. Economy of manufacture results from the use of the dual motor employing a single field coil for operating a pair of rotors. One of the rotors serves as a power drive for the toast carriage and the other rotor, in the form of a gear reduction clock rotor, drives a timing mechanism. This timing mechanism includes a thermostatic strip subjected to the temperature within the toasting compartment for automatic temperature compensation of the time interval during which the toaster is energized. Furthermore, the time of the toasting cycle is under the control of the operator through the use of a color control lever extending outside of the toaster casing. Finally, a simple arrangement is provided by which the toaster operator may selectively retain toast within the toaster after completion of a toasting cycle, or permit it to automatically raise to an exposed position.

While the present invention has been described by reference to a particular embodiment thereof, it is to be understood that numerous modifications may be made by those skilled in the art without actually departing from the invention. I, therefore, aim in the appended claims to cover all such equivalent variations as come within the true spirit and scope of the foregoing disclosure.

What I claim as new and desire to secure by Letters Patent of the United States is:

1. In an automatic electric toaster, a toast carriage, a bias biasing said carriage to non-toasting position, a dual electric motor having a power drive rotor, a timing rotor and a single field structure, means operated by said power drive rotor for moving said toast carriage to toasting position, means energizing said field structure to cause said power drive rotor to move said toast carriage to toasting position and for maintaining the energization thereof so that it remains stalled thereby to hold said toast carriage in toasting position, and means operated by said timing rotor to interrupt the energization of said field structure after a predetermined time interval, whereupon said bias of said toast carriage returns it to non-toasting position.

2. In an automatic electric toaster of the type having a toast carriage resiliently biased to non-toasting position, means for driving said carriage to toasting position and timing the period of toasting, said means comprising a dual electric motor with an induction motor rotor, a synchronous motor rotor and a common field structure, a reduction drive connecting the toast carriage to the induction motor rotor for moving the toast carriage to toasting position upon rotation of the induction motor rotor, a normally closed switch movable to open position for terminating operation of said dual motor whereupon the resilient biasing of the carriage returns it to non-toasting position, and a timer drive operable by rotation of said synchronous motor rotor to open said switch after a predetermined time interval.

3. In an automatic electric toaster of the type having a toast carriage resiliently biased to non-toasting position, means for driving the carriage to toasting position and timing the period of toaster operation, said means comprising a dual electric motor with an induction motor rotor, a synchronous motor rotor and a common field structure, a reduction drive adapted to move the toast carriage to toasting position upon rotation of the induction motor rotor, a normally closed switch movable to open position for terminating operation of said dual motor whereupon the resilient biasing of the carriage returns it to non-toasting position, a timing gear for opening said switch, a pinion driven by said synchronous motor rotor, and means actuated by movement of said carriage from non-toasting to toasting position for effecting engagement between said gear and pinion to start the timing operation.

4. In an automatic electric toaster, a toast carriage movable between non-toasting and toasting positions, means biasing the toast carriage to non-toasting position, an electric motor, means connecting the electric motor to the toast carriage for moving the toast carriage from non-toasting to toasting position to start a toasting operation, a circuit for the electric motor including a manually operable switch biased to closed position and normally held in open position by the toast carriage when in non-toasting position, and a normally closed switch, said switches when both are closed effecting operation of the electric motor to move the toast carriage from non-toasting to toasting position and maintain it in toasting position, and timing means for actuating said normally closed switch to effect return of the toast carriage from toasting to non-toasting position, said timing means comprising a synchronous motor, a pinion driven by the motor, a timer gear normally out of mesh with said pinion, means carried by the timer gear for actuating said switch after the timer gear has moved a predetermined distance with respect to said switch, and means actuated by movement of the toast carriage from non-toasting to toasting position for effecting engagement between said pinion and timer gear.

JOHN H. PALMER.

REFERENCES CITED

The following references are of record in the file of this patent:

UNITED STATES PATENTS

| Number | Name | Date |
|---|---|---|
| Re. 18,923 | Harris | Aug. 22, 1933 |
| 1,987,703 | Oneill | Jan. 15, 1935 |
| 2,070,333 | Freeman | Feb. 9, 1937 |
| 2,099,210 | Ireland | Nov. 16, 1937 |
| 2,266,301 | Biebel | Dec. 16, 1941 |
| 2,307,347 | Anderson | Jan. 5, 1943 |
| 2,347,385 | Wright et al. | Apr. 25, 1944 |
| 2,356,649 | Bucker | Aug. 22, 1944 |
| 2,359,580 | Poole | Oct. 3, 1944 |
| 2,509,693 | Morrison | May 30, 1950 |